Sept. 2, 1958  W. H. HAWKINS  2,849,895
CLOSURE PLUGS
Filed April 10, 1956

INVENTOR
WALLACE HAWKINS
BY
ATTORNEY

United States Patent Office 2,849,895
Patented Sept. 2, 1958

2,849,895

CLOSURE PLUGS

Wallace Hampton Hawkins, Panama City, Fla.

Application April 10, 1956, Serial No. 577,315

10 Claims. (Cl. 74—606)

This invention relates to closure plugs, and more particularly to an improved closure plug especially designed to reseal the rear shaft-opening of a vehicle transmission housing when the propeller shaft has been pulled for repair or to enable the vehicle to be towed on the highway.

Since the normal level of lubricant maintained in a vehicle transmission housing is substantially above that of the rear shaft opening thereof, the lubricant will run out through said opening when the propeller shaft is removed for vehicle repair, it being estimated that two to four quarts of the lubricant will be lost if it is given time to drain off to that extent. And if the front of the vehicle is raised during the repair operation, the lubricant loss may even be greater, as in such case the lubricant level in the then lower rear portion of the transmission housing is raised substantially above that of said rear shaft-opening. The same objectionable lubricant loss usually occurs when the propeller shaft of an automatic transmission is pulled as is required to enable the vehicle which it serves to be towed over the road. When being towed up steep grades, additional lubricant loss comparing to that suffered upon the front end of a vehicle being raised for repair as aforesaid also takes place during towing. Considering that the lubricant used in vehicle transmission is a special type oil which is both difficult to clean from floors, clothes and tools, and is relatively expensive in its replacement as required before the vehicle can again be driven, the desirability of protecting against lubricant loss when the propeller shaft has been removed for cause becomes clear.

Stated broadly, a principal object of the invention is the provision of a closure plug for use by automobile repair mechanics, tow car drivers and operators, and the like, in closing off and resealing the rear shaft-opening of a vehicle transmission housing when the propeller shaft and its front universal joint assembly, which latter drivingly connects the transmission output shaft to the propeller shaft, has been pulled for vehicle repair or vehicle towage operations, thereby protecting against loss of the lubricant required to be maintained within the transmission housing during normal vehicle driving, and assuring both a cleaner operation and a substantial saving of lubricant.

A more specific object of the invention is the provision of a closure plug as aforesaid, which is so constructed and arranged that it is easy to handle and assemble and is thoroughly dependable in operation.

Yet another object of the invention is the provision of a closure plug as aforesaid characterized by simple design, as well as relatively inexpensive construction in terms of the substantial economies which it makes possible.

Still another object of the invention is the provision of a closure plug as aforesaid, whose construction and arrangement is such that it is adapted to fit substantially the entire size-range of seals with which the rear or propeller shaft openings of vehicle transmission housings are conventionally provided, whereby a single plug is adapted for use with substantially all of the various makes and types of transmissions now in current use.

Another and more detailed object of the invention is the provision of a closure plug characterized as in the foregoing, and which is further featured by the ability to snugly fit the usually splined periphery of the tail- or output-shaft of the transmission which in most transmissions projects rearwardly through the rear opening of the transmission housing, as results both in the plug securing itself to the shaft and being accurately centered within said opening.

The above and other objects and advantages of a closure plug for vehicle transmissions according to this invention will appear from the following detailed description thereof, reference being had to the accompanying drawings illustrating preferred physical embodiments of closure plugs as herein proposed, in which.

Figure 1:
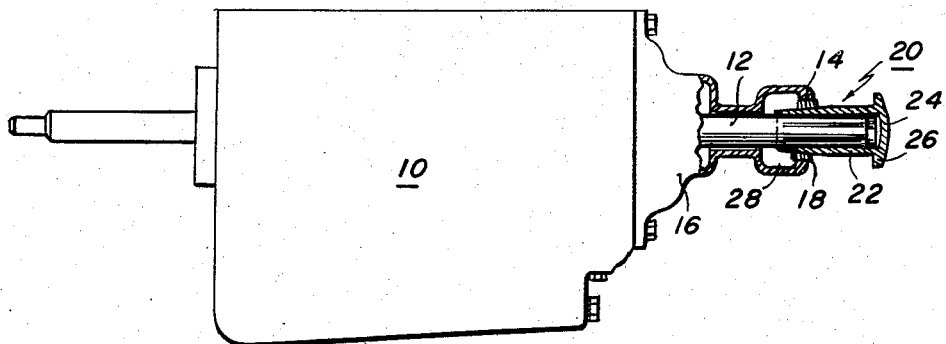
Fig. 1 is a somewhat diagrammatic view illustrating a conventional vehicle transmission, with the propeller shaft which is normally driven therefrom pulled for repair or to enable the vehicle to be towed over the highway, and with the opening in the transmission housing being resealed by one form of closure plug of the invention.

Referring to the drawings, reference numeral 10 generally designates the housing of a standard automatic transmission whose splined output shaft 12 projects through an opening 14 in the rear wall of said housing, or, more properly, through the rear end of tubular extension 16 thereof which is secured as by bolts to the rear end of the transmission housing proper, substantially as shown. The opening 14 has substantially larger internal diameter than that of said output shaft projecting therethrough, but said opening around the shaft 12 is normally closed by the cylindrical, externally splined forward end portion of a universal joint assembly through which said shaft is drivingly connected to the vehicle propeller shaft extending to the differential, and by a conventional rotary-shaft type oil seal 18 secured to the housing along the opening edge and which sealingly engages with said cylindrical splined portion. The aforesaid universal joint assembly and the propeller shaft have not been illustrated because it is assumed that they have been removed as a unit for a repair operation or to enable a vehicle which they serve to be towed over the highway. Heretofore, such resulted in substantial loss of the expensive lubricant used in transmissions and in objectionable soiling of floors, pavements, clothes and tools.

According to the invention, such lubricant loss and messiness caused thereby are simply yet effectively overcome through the provision of a closure plug serving in conjunction with the aforesaid oil seal 18 to close off and reseal the opening around the splined output shaft 12, to at least the same degree that the cylindrical, internally splined portion of the universal joint assembly and seal does so prior to the joint being pulled together with the propeller shaft. More particularly, the invention provides a closure plug generally designated 20 which, in the Figs. 1–3 form, has an elongated cylindrical body portion 22 open at one end and which is closed at its other end by an end wall or cap 24 which may be enlarged radially as shown to form a grip rim 26.

The length of the cylindrical portion 22 of the plug is such that when slipped thereover it will enclose the projecting end of the transmission output shaft 12 and at the same time extend a substantial distance forwardly into the transmission housing through the housing shaft-open 14. Its internal diameter is sufficiently large as to adapt it to fit over all of the standard sizes of transmission output shafts, and the outside diameter of its major length portion is undersize as respects the housing opening 14 and at the same time somewhat oversize as respects the largest diameter (internal) of oil seal 18 likely to be encountered. In order to adapt the closure plug to substantially all sizes of oil seals conventionally used to seal the housing shaft-opening, the forward or open-end half (approximate) of the plug is externally tapered as at 28, the taper being in direction such that the external diameter of the cylindrical body portion 22 of the plug decreases from approximately its middle portion towards its open end. Thus it will be understood that when slipped over the projecting end of the splined output shaft 12 and pushed "home" into the housing opening 14, the tapered surface 28 of the plug will engage against the inner peripheral edge of the seal 18, regardless of size variation of the latter, with sufficient friction as both to secure the plug in place and to provide an effectively sealed closure for the opening extending around said output shaft.

Figure 2:
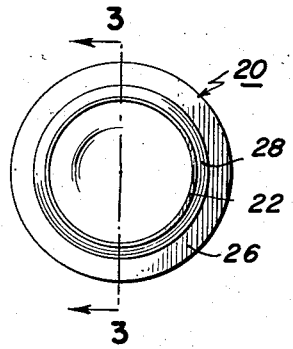
Fig. 2 is an end view looking into the front or open end of said closure plug.
Figure 3:
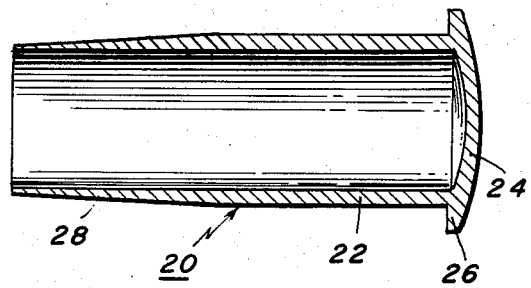
Fig. 3 is an enlarged longitudinal section of the closure plug taken on line 3—3 of Fig. 2.

The design of closure plug according to the Figs. 1–3 form thereof adapts it to be fashioned of metal. A preferred metal for use in making up the closure plug of the invention is aluminum, since closure plugs made therefrom may be initially formed as rough castings and then simply machined to proper size and taper, and they are also characterized by lightness in weight, making them easy to store and carry about. Aluminum closure plugs are also easy to clean and, because of their relatively bright surface, they are easy to see in the semi-darkness beneath a vehicle.

I have also ascertained that closure plugs effectively serving the objectives of the invention may also be formed as moldings from plastic materials selected for their toughness and resistance to deterioration under the effects of the lubricants employed in automotive transmissions. Such a plastic plug is illustrated at 30, Figs. 4–6, and comprises an axially elongated, shell-like body 32 open at one end and closed at its other end by a simple unflanged end wall 34. As with the aluminum closure plug previously described, the axial length of the plug 30 is such as to enable it both to fit over the projecting end of the transmission output shaft 12 and to extend an appreciable distance forwardly through the housing opening therefor, its inner diameter is such as to enable it to fit over substantially all sizes of output shafts employed in standard transmissions, its largest external diameter is undersize with respect to the diameter of said housing opening 14 but oversize with respect to the diameter of the opening of the oil seal 18, and it is formed with an externally tapered peripheral portion 38 adjacent its open end, whose taper is such as to enable the plug to fit all sizes of seals employed in transmission openings, as explained above.

Figure 5:
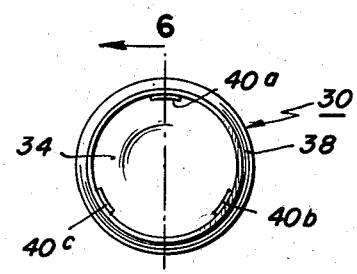
Figs. 4, 5 and 6 are views corresponding to Figs. 1–3, respectively, but illustrating a modified form of closure plug according to the invention.
Figure 6:
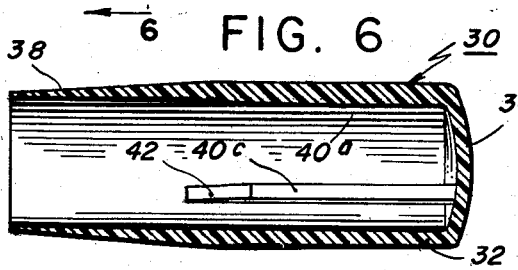

In addition to its being made from plastic material, the plastic closure plug 30 is preferably featured by a plurality of circumferentially spaced, axially extending ribs 40a, 40b, 40c, which project radially inwardly from the internal peripheral surface of the plug, as best seen in Figs. 5 and 6. Referring to Fig. 5, the arcuate length (width dimension) of said ribs is greater than the width of the grooves between each two adjacent splines of the output shaft 12; that is to say, the ribs are sufficiently wide as to bridge the space between any two adjacent splines. Preferably also, the inner arcuate surfaces of said ribs constitute arcs of a circle having diameter slightly less than the smallest diameter of output shaft 12 normally to be encountered, whereby the effect of said ribs is to exert at least a slight gripping effect on an output shaft when pushed axially thereover, as in Fig. 4.

Preferably, and as seen in Fig. 5, the ribs 40a, 40b, 40c are provided on only the rear or closed half-end of the closure plug. Moreover it will be seen that, rather than terminating in abrupt shoulders, the forward ends of the ribs incline radially outwardly as at 42, thus to merge into the large-diameter inner surface of the plug. It will be understood that the end inclinations 42 on the ribs facilitate mounting of the plug in that they obviate any sharply-angled internal shoulders as might interfere with relatively free telescoping movement of the plug over the projecting end of the transmission output shaft.

The aforesaid internal ribs 40a, 40b, 40c serve a plurality of functions. For example, they provide a looser fit of the open end of the plug with respect to an output shaft as makes for easy placement of the plug on the shaft. They also enable a single closure plug to fit a greater range of shaft sizes, since the provision of the ribs enables the rearward end of the plug to deform slightly between ribs, and thereby effectively to enlarge, when the plug is pushed over an oversize output shaft. Normally, the ribs enable the closure plug to exercise a friction grip on the shaft over which it is pushed, as makes for a better hold of the plug on the shaft, and they also exercise a centering action on the plug as it is being pushed "home" into the transmission opening.

Figure 4:
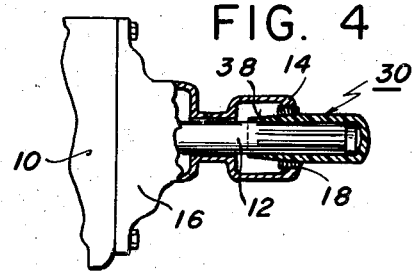

For purposes of complete disclosure but without the invention being limited thereto, the significant dimensions of a plastic closure plug of the Figs. 4–6 form giving excellent service in use and fitting substantially the various vehicle transmissions and their output shafts now currently in use, are as follows:

| | |
|---|---|
| Outside length _____inches__ | 4 1/16 |
| Inside length _____do____ | 3 13/16 |
| Outside diameter _____do____ | 1.70 |
| Inside diameter _____do____ | 1.38 |
| Length external taper portion (38) _____do____ | 1 13/16 |
| External diameter differential provided by taper (38) _____inches__ | .25 |
| Number of internal ribs _____ | 3 |
| Length of ribs (overall) _____inches__ | 2 |
| Radial thickness of ribs _____do____ | .112± |
| Length of inclinations 40 at end of ribs__do____ | 1/2 |

Without further analysis it will be seen that the invention provides a simple yet effective plug for resealing the annular opening extending about the output shaft of an automotive transmission following pulling of the propeller shaft and the universal joint assembly from driving connection therewith when vehicle repairs are being made or preparatory to towing of the vehicle over the highway. In addition to its simple design and inexpensive construction, a closure plug according to either of the herein disclosed forms thereof may be readily telescoped over the projecting end of the output shaft and pushed "home" against the oil seal which normally sealingly engages with the cylindrical, internally splined portion of the universal joint assembly prior to its being pulled with the propeller shaft. By proper dimensioning as explained, a single closure plug according to the invention may be used to re-seal the rear shaft-opening of practically all vehicle transmissions now in use; that is to say, one such closure plug in a mechanic's kit may be employed for any number and makes of vehicles which he may be called upon to repair, and the same is true as respects a single closure plug being usable by a tow-car driver or operator on all the various makes of automobile he is required to tow over the road.

As many changes could be made in carrying out the above constructions without departing from the scope of the invention, it is intended that all matter contained in the above description or shown in the accompanying drawings shall be interpreted as illustrative and not in a limiting sense.

I claim:

1. The combination of a vehicle transmission housing having a shaft opening in its rear wall, a transmission output shaft extending horizontally from said housing through said opening, said shaft having lesser diameter than said opening, the annular space between the opening edge and said shaft being normally closed off by a universal joint assembly drivingly connected to said shaft, and means for resealing said opening when said assembly is removed comprising a cylindrical body having one end open and its other end closed, said body having axial length greater than the projecting shaft end, internal diameter greater than but substantially equaling that of the diameter of said output shaft, and external diameter less than but substantially equaling that of the housing opening, the plug being telescoped over the projecting shaft end and axially located therealong in a position such that its inner open end portion extends into and fills said opening.

2. The combination substantially as set forth in claim 1, wherein said inner end portion of the plug is externally tapered so as to have progressively decreasing diameter towards its open end, whereby said plug is adapted to fit different size openings.

3. The combination substantially as set forth in claim 1, and wherein said plug is fashioned from metal.

4. The combination substantially as set forth in claim 3, wherein the end wall forming the closed end of the plug is extended radially outwardly and forms a grip flange.

5. The combination substantially as set forth in claim 1, wherein said plug is fashioned from plastic material.

6. The combination substantially as set forth in claim 1, wherein a plurality of circumferentially spaced, axially extending and radially inward ribs are provided on the inner peripheral surface of the closed end portion of the cylindrical body of the plug, the inner surface of the ribs being arcuate and lying on a common circle having diameter slightly less than the diameter of said shaft whereby said plug frictionally grips said shaft.

7. The combination substantially as set forth in claim 6, wherein the ends of the ribs adjacent the open inner end of the plug body are inclined whereby said ribs merge into the inner peripheral surface of said body.

8. The combination substantially as set forth in claim 1, wherein a rotary-shaft type oil seal extends about and defines said housing opening, and wherein said inner end portion of the cylindrical plug body has an external taper calculated to adapt the plug to the various sizes of oil seals used in vehicle transmissions.

9. The combination substantially as set forth in claim 1, wherein a rotary-shaft type oil seal extends about and defines the outer edge of said housing opening, and wherein said plug is fashioned from plastic material and its cylindrical body has an external taper on its inner end portion for adapting said plug to oil seals of various sizes, the significant dimensions of said plug being as follows: axial length 4 1/16" (outside) and 3 13/16" (inside); diameter 1.70" (outside) and 1.38" (inside); and taper .25" diameter differential in 1 13/16" length of plug.

10. The combination substantially as set forth in claim 1, wherein a rotary-shaft seal extends about and defines the outer edge of said housing opening, and wherein said closure plug is fashioned from plastic material and its cylindrical body has an external taper on its inner end portion for adapting said plug to oil seals of various size, and is provided on its inner surface with a plurality of circumferentially spaced, radially inward ribs which extend from the closed end of the body to approximately its mid portion, the significant dimensions of said plug being as follows: axial length 4 1/16" (outside) and 3 13/16" (inside); diameter 1.70" (outside) and 1.38" (inside); taper .25" diameter differential in 1 13/16" length of plug; and radial thickness of ribs .112"±.

References Cited in the file of this patent

UNITED STATES PATENTS

| | | |
|---|---|---|
| 1,814,141 | Fox et al. | July 14, 1931 |
| 2,526,225 | Gronemeyer | Oct. 17, 1950 |
| 2,649,090 | Parsons et al. | Aug. 18, 1953 |
| 2,723,041 | Hart-Still | Nov. 8, 1955 |

FOREIGN PATENTS

| | | |
|---|---|---|
| 1,084,654 | France | July 13, 1954 |
| 1,093,604 | France | Nov. 24, 1954 |